United States Patent
Takizawa (10) Patent No.: US 8,437,552 B2
(45) Date of Patent: May 7, 2013

(54) INFORMATION PROCESSING APPARATUS AND METHOD, AND A RECORDING MEDIUM STORING A PROGRAM FOR IMPLEMENTING THE METHOD

(75) Inventor: Junichi Takizawa, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 1056 days.

(21) Appl. No.: 12/329,836

(22) Filed: Dec. 8, 2008

(65) Prior Publication Data

US 2009/0161960 A1 Jun. 25, 2009

(30) Foreign Application Priority Data

Dec. 20, 2007 (JP) ................................. 2007-328906

(51) Int. Cl.
*G06K 9/46* (2006.01)
(52) U.S. Cl.
USPC .......................................................... 382/190
(58) Field of Classification Search .................. 382/162, 382/190, 203, 218, 309; 348/207.99, 333.12; 715/202, 835
See application file for complete search history.

(56) References Cited

U.S. PATENT DOCUMENTS

| | | | | |
|---|---|---|---|---|
| 5,706,457 A | * | 1/1998 | Dwyer et al. | ................. 715/835 |
| 6,282,317 B1 | * | 8/2001 | Luo et al. | ..................... 382/203 |
| 6,623,528 B1 | * | 9/2003 | Squilla et al. | ................. 715/202 |
| 7,639,300 B2 | * | 12/2009 | Yumiki | ..................... 348/333.12 |
| 7,643,706 B2 | * | 1/2010 | Wagner et al. | ................ 382/309 |
| 2002/0131641 A1 | * | 9/2002 | Luo et al. | ..................... 382/218 |
| 2002/0140820 A1 | * | 10/2002 | Borden, IV | .............. 348/207.99 |
| 2003/0135497 A1 | | 7/2003 | Mochizuki | |

FOREIGN PATENT DOCUMENTS

| | | |
|---|---|---|
| JP | 2003-208444 A | 7/2003 |
| JP | 2004-007168 A | 1/2004 |
| JP | 2007-194948 A | 8/2007 |
| JP | 2007-310813 A | 11/2007 |

OTHER PUBLICATIONS

Office Action established for JP 2007-328906 (May 29, 2012).
Office Action established for JP 2007-328906 (Oct. 30, 2012).

* cited by examiner

*Primary Examiner* — Duy M Dang
(74) *Attorney, Agent, or Firm* — Drinker Biddle & Reath LLP (57) ABSTRACT

A photographing apparatus and method for archiving a plurality of images as a single file, and a recording medium having a computer program for executing the method. The photographing apparatus and method employ a feature subject extracting unit for determining one of the plurality of images as a main image and extracting a feature subject from the main image, an image selecting unit for selecting an image including the feature subject, and an image archiving unit for archiving the main image and the image selected by the image selecting unit.

15 Claims, 8 Drawing Sheets

INFORMATION PROCESSING APPARATUS AND METHOD, AND A RECORDING MEDIUM STORING A PROGRAM FOR IMPLEMENTING THE METHOD

CROSS-REFERENCE TO RELATED PATENT APPLICATIONS

This application claims the benefits of Japanese Patent Application No. 2007-328906, filed on Dec. 20, 2007, in the Japanese Intellectual Property Office, the entire content of which is incorporated herein by reference.

BACKGROUND OF THE INVENTION

1. Field of the Invention

The present invention relates to an information processing apparatus and method, and a recording medium storing a program for implementing the method. More particularly, the present invention relates to an information processing apparatus, an information processing method, and a recording medium storing a program for implementing the method, by which a plurality of images are archived as a single file.

2. Description of the Related Art

In order to view images captured by a photographing apparatus, such as a digital camera or a digital single-lens reflex camera, in an information processing apparatus, such as a personal computer (PC) or a television capable of displaying the captured images, the captured images are displayed one by one or as thumbnail images. An archive or a file format that stores a plurality of images as a single file is expected to be introduced as a new method of viewing images.

Japanese Laid-open Patent No. 2007-194948 discloses technology for extracting an image satisfying a predetermined requirement from a plurality of images recorded in a recording device, such as a hard disk. The patent also discloses technology for obtaining location information of a plurality of images by using a global positioning system (GPS) when the images are captured, storing the captured images and the location information, and extracting some images from among the stored images by using the location information, so that an image captured in a nearby range can be obtained.

However, the technology disclosed in the above patent necessarily requires GPS in order to obtain the location information of the images when the images are captured, and to obtain the image captured in the nearby range.

SUMMARY OF THE INVENTION

The present invention provides an information processing apparatus and method, and a recording medium storing a program for implementing the method, by which a main image is selected from a plurality of images, a feature subject is extracted from the main image, and the main image and other images including the feature subject extracted from the main image are archived as a single file.

An embodiment of the present invention provides a photographing apparatus for archiving a plurality of images as a single file. The photographing apparatus comprises a feature subject extracting unit for determining one of the plurality of images as a main image and extracting a feature subject from the main image, an image selecting unit for selecting an image including the feature subject, and an image archiving unit for archiving the main image and the image selected by the image selecting unit. The feature subject extracting unit determines one of the plurality of images as a main image and extracts a feature subject from the main image. The image selecting unit selects an image including the feature subject, and the image archiving unit archives the main image and the image selected by the image selecting unit. Thus, a main image may be selected from the plurality of images, a feature subject may be extracted from the main image, and the main image and an image including the feature subject extracted from the main image may be archived as a single file.

In one example, the feature subject extracting unit may extract the feature subject that is only included in the image selected by the image selecting unit, so that the image selecting unit selects a image only including the feature subject that is only included in the image selected by the image selecting unit. In this example, the feature subject that is only included in the image selected by the image selecting unit is selected, and the image only including the feature subject that is only included in the image selected by the image selecting unit is selected. Thus, a feature subject that is only included in a corresponding image may be further extracted from the image including the feature subject that is included in the main image, and images including the extracted feature subject may be searched and archived so that archived images can be extended.

The image archiving unit may include accompanying information in the archived main image and the image selected by the image selecting unit. The accompanying information may be information of directions with regard to the main image and the image selected by the image selecting unit. Therefore, corresponding accompanying information may be used to read the archived images, and the information of directions with regard to the main image may be archived as the accompanying information, thereby selecting a direction when reading the archived images, and making it possible to read another image included in the archived images.

Another embodiment of the present invention provides an information processing method of archiving a plurality of images as a single file. The method comprises determining one of the plurality of images as a main image and extracting a feature subject from the main image, selecting an image including the feature subject, and archiving the main image and the selected images. Another embodiment of the present invention provides a recording medium having recorded thereon a computer program for executing this information processing method of archiving a plurality of images as a single file.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Exemplary embodiments of the present invention will be described in detail with reference to the attached drawings. Like reference numerals in the drawings denote like elements.

Figure 1:
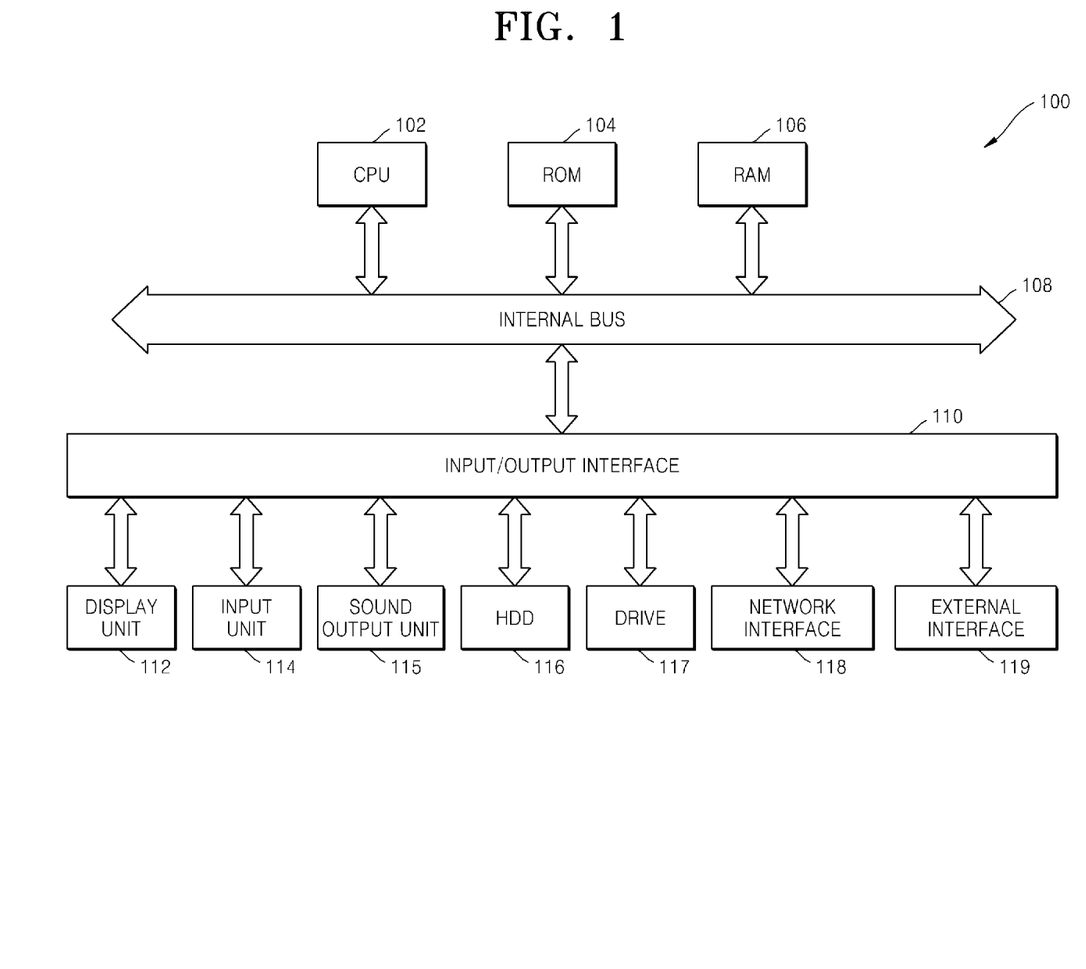
FIG. 1 is a block diagram of an example of the hardware structure of an information processing apparatus according to an embodiment of the present invention.

FIG. 1 is a block diagram of the hardware structure of an information processing apparatus 100 according to an embodiment of the present invention. The information processing apparatus 100, which may be a personal computer (PC) or any other suitable device, comprises a central processing unit (CPU) 102, a read only memory (ROM) 104, a random access memory (RAM) 106, an internal bus (108), an input/output interface 110, a display unit 112, an input unit 114, a sound output unit 115, a hard disk drive (HDD) 116, a drive 117, a network interface 118, and an external interface 119. The CPU 102 performs numerical calculations, information processing, device control, and so on, by sequentially reading and outputting a program stored in the ROM 104 or data stored in the RAM 106 based on a signal in response to an instruction input by a user into the input unit 114 of the information processing apparatus 100 or a signal transmitted from an external device through the network interface 118.

The ROM 104 stores fixed data among programs or operation parameters used by the CPU 102 to perform the numerical calculations, information processing, device control, etc. The RAM 106 stores variable data among programs or operation parameters used by the CPU 102 to perform the numerical calculations, information processing, device control, etc.

The internal bus 108 is a path used to exchange data inside the information processing apparatus 100. The CPU 102, the ROM 104, and the RAM 106 are electrically connected via the internal bus 108. The internal bus 108 is connected to the input/output interface 110, and sends the signal in response to the instruction input by the input unit 114 or a signal transmitted from another device connected to the information processing apparatus 100 over a network via the network interface 118 to the CPU 102 via the input/output interface 110.

The input/output interface 110 interfaces an input/output exchange of information. The input/output interface 110 is connected to the display unit 112, the input unit 114, the sound output unit 115, the drive 117, the network interface 118, and the external interface 119. The input/output interface 110 is connected to the internal bus 180 as described above, and sends the signal in response to the instruction input by the input unit 114 or the signal transmitted from another device connected to the information processing apparatus 100 over the network via the network interface 118 to the CPU 102 via the internal bus 180.

The display unit 112 displays content input by the input unit 114 or result information obtained by performing, in the CPU 102, the numerical calculations, information processing, device control, etc. An example of the display unit 112 is a liquid crystal display (LCD), an organic electroluminescence (EL) display device, etc.

The input unit 114 is used by the user of the information processing apparatus 100 to input various instructions with regard to the CPU 102. An example of the input unit 114 is a button, a keyboard, or a touch pad, etc.

The sound output unit 115 outputs sound generated by the information processing apparatus 100 to perform a processing accompanied by an output of sound. The HDD 116 has a hard disk installed therein, drives the hard disk, records and reproduces program or information (for example, a video file) that is read and executed by the CPU 102.

The drive 117 installs a movable recording medium therein, and transmits/receives data between the recording medium and the information processing apparatus 100. Examples of the movable recording medium are a magnetic disk, an optical disk, an magneto-optical disk, a semiconductor memory, etc. The drive 117 can be a device capable of reading the recording medium.

The network interface 118 transmits/receives information with another device connected to the information processing apparatus 100 over the network wirelessly or by wire. The external interface 119 interfaces an exchange of information with peripheral devices connected to the information processing apparatus 100. An example of the external interface 119 is a universal serial bus (UBS), etc.

An example of the function of the information processing apparatus 100 will now be described.

Figure 2:
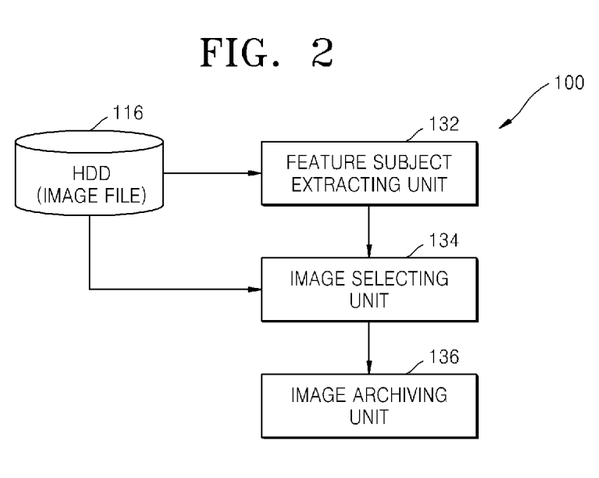
FIG. 2 is a block diagram of an example of the functional structure of the information processing apparatus shown in FIG. 1 according to an embodiment of the present invention.

FIG. 2 is a block diagram of an example of the functional structure of the information processing apparatus 100 according to an embodiment of the present invention. The functional structure of the information processing apparatus 100 will now be described with reference to FIG. 2.

The information processing apparatus 100 comprises a feature subject extracting unit 132, an image selecting unit 134, and an image archiving unit 136.

The feature subject extracting unit 132 extracts a feature subject, such as a person or a building, from an image recorded on a recording medium installed in the HDD 116 or the drive 117. In this embodiment, the feature subject is extracted from the image recorded on the HDD 116. A well-known method may be used to extract the feature subject. For example, a range of the feature subject may be determined by analyzing a brightness distribution of the image, extracting points having a relatively great difference, and collecting the extracted points.

The image selecting unit 134 selects images including the feature subject extracted from the feature subject extracting unit 132 from a plurality of images recorded on the recording medium installed in the HDD 116 and the drive 117, or another information processing apparatus connected to a network via the network interface 118. In this embodiment, the image selecting unit 134 selects images including a feature subject extracted from a previously determined main image.

The image archiving unit 136 archives a plurality of images as a single file. In the present embodiment, the image archiving unit 136 archives the previously determined main image and the images selected by the image selecting unit 134. In this regard, one or more files may be archived like a ZIP format, or one or more image files and accompanying information thereof may be archived. The accompanying information may be a photographing date of an image file or a direction between an image file and another image file. The archived file may be recorded on an optional medium.

An information processing method performed by the information processing apparatus 100 will now be described.

Figure 3:
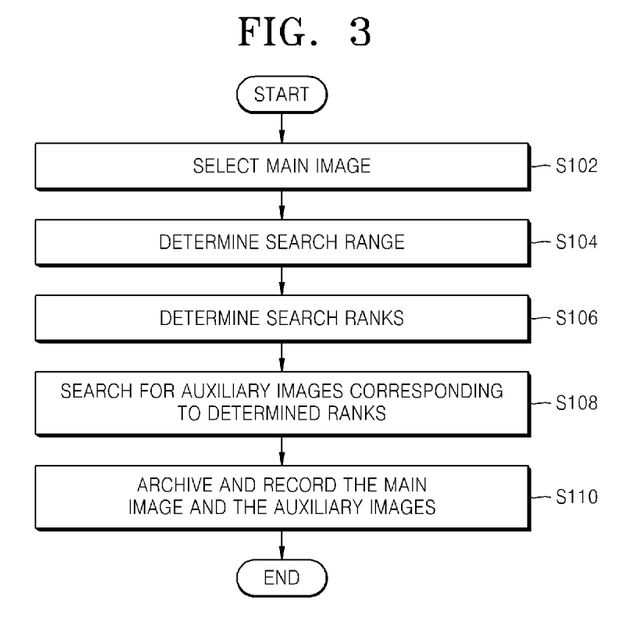
FIG. 3 is a flowchart illustrating an example of an information processing method performed by the information processing apparatus shown in FIG. 1 according to an embodiment of the present invention.

FIG. 3 is a flowchart illustrating an example of an information processing method performed by the information processing apparatus 100 according to an embodiment of the present invention.

In operation 102, an image file is selected as a main image from a plurality of image files recorded on a recording medium installed in the HDD 116 or the drive 117 of the information processing apparatus 100. The main image may be selected by executing a computer program operating in the information processing apparatus 100, displaying an image file selection screen on the display unit 112, and by a user of the information processing apparatus 100 manipulating the input unit 114.

In operation 104, a range for searching for another image file including a feature subject that is included in the main image is determined. The range may be a folder included in the recording medium installed in the HDD 116 or the drive 117, or photographing dates of the plurality of image files recorded on the recording medium installed in the HDD 116 or the drive 117. The range may be determined by using a screen displayed on the display unit 112 by executing the computer program operating in the information processing apparatus 100.

In operation 106, a search rank range is determined. An image that can be searched in the main image is determined as a rank 1. An image that can be searched in a current rank and that does not belong to a lower rank is determined to belong to an upper rank. Therefore, if a search rank is elevated, a search range is extended.

Figure 4:
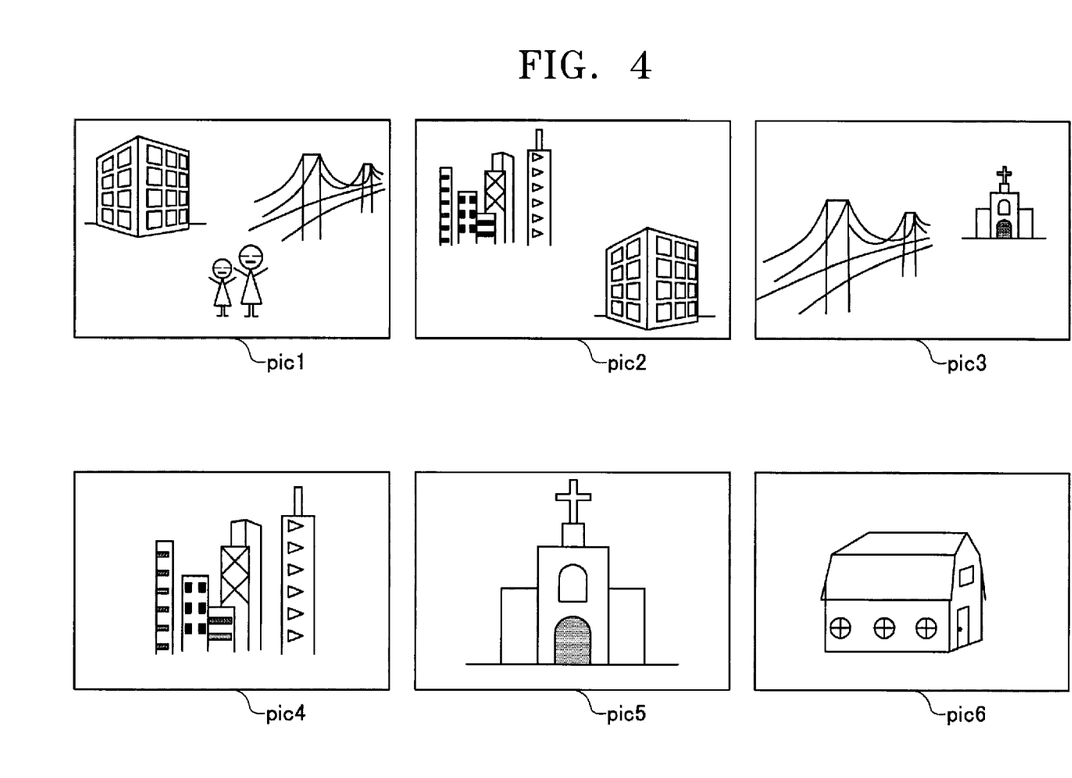
FIG. 4 is a diagram for explaining an example of a relationship between images and search ranks in the information processing method shown in FIG. 3 according to an embodiment of the present invention.

FIG. 4 is a diagram for explaining an example of a relationship between images and search ranks in the information processing method shown in FIG. 3 according to an embodiment of the present invention. Referring to FIG. 4, a main image pic1 includes a building and a bridge as feature subjects. The building and the bridge included in the main image pic1 are included in an image pic2 and an image pic3, respectively. Therefore, the images pic2 and pic3 are rank 1 images.

The image pic2 includes a group of high buildings. The group of high buildings included in the image pic2 is included in an image pic4. Therefore, the image pic4 is a rank 2 image. A church included in the image pic3 is included in an image pic5. Therefore, the image pic5 is a rank 2 image.

If the search rank range is the rank 1, search images include the images pic2 and pic3. If the search rank range is the ranks 1 and 2, search images include the images pic2, pic3, pic4, and pic5.

As further shown, an image pic6 has no common feature subject with the other images. Therefore, if search images include the images pic2, pic3, pic4, pic5, and pic6, the image pic6 is not selected even though a search rank is elevated.

In operation 108, images included in the search rank range determined in operation 106 are searched within the range for searching determined in operation 104. The images searched in operation 108 refer to auxiliary images. In more detail, auxiliary images correspond to the images included in the ranks 1, 2, . . . . In this embodiment, auxiliary images are searched by extracting the feature subject included in the main image in the feature subject extracting unit 132, and finding the rank 1 images according to whether the feature subject is included in an image file within the determined range.

An example of the image file search method will now be described. However, the image file search method in this embodiment is not limited to this exemplary embodiment, but rather, other image file search methods can be used.

In this example, the feature subject extracting unit 132 extracts a feature subject from the main image determined in operation 102. As described above, a range of the feature subject may be determined by analyzing a brightness distribution of the image, extracting points having a relatively great difference compared to other points, and collecting the extracted points. In this embodiment, although the number of feature subjects extracted from the main image is not limited, the number of feature subjects extracted from a single image file may be limited.

If the range of the feature subject is determined, one side of the range is normalized to a previously determined length. For example, when the longer side of the range is normalized to 50 pixels as the previously determined length, the longer side of 100 pixels is normalized to 50 pixels and a shorter side is normalized according to the same normalization rate, so that the longer and shorter sides of the range of the feature subject are reduced to half. Furthermore, information including a color or capture time of an image may be stored temporarily inside (for example, the RAM 106) of the information processing apparatus 100 as information used to search for the image.

If the feature subject is completely extracted from the main image, an image (i.e., the rank 1 images) including a feature subject that is extracted from the main image is searched for from the range for searching determined in operation 104. In more detail, the feature subject extracting unit 132 extracts a feature subject from all image files included in the range determined in operation 104, and normalizes a range of the extracted feature subject, and the image selecting unit 134 determines whether the extracted feature subject is the same as the feature subject of the main image.

Whether the extracted feature subject is the same as the feature subject of the main image may be determined by determining whether a ratio of a normalized longer side and a shorter side is within a predetermined error range, or whether a difference in an angle between the longer side and the shorter side is within a predetermined range. Also, it is determined whether the extracted feature subject is the same as the feature subject of the main image according to the correlation between the main image and the search images. For example, a correlation coefficient is calculated based on (x,y)=(main image feature subject area luminance, search image feature subject area luminance), and, if the correlation coefficient exceeds a predetermined value, the feature subject of the search image may be determined to be the same as the feature subject of the main image. Furthermore, it is determined whether the feature subject of the search image is the same as the feature subject of the main image by using information including a color or a capture time of the main image that is temporally stored inside (for example, the RAM 106) of the information processing apparatus 100 as information used to search for the image.

There can be a plurality of images that can include the feature subject extracted from the main image. In this case, all the images can be selected as rank 1 images, or some images satisfying a predetermined requirement can be selected as the rank 1 images. The predetermined requirement is that some images having a relatively high identity with the feature subject of the main image can be selected as the rank 1 images, or images having a short or long period from a capture time of the main image can be selected as the rank 1 images.

If the search rank range determined in operation 106 is the rank 1, the image search process is completed. If the search rank range determined in operation 106 is higher than the rank 2, the search is repeated until the search for the determined rank is completed and a search for image in rank 1 is completed.

If the image search process is completed, in operation 110, the main image determined in operation 102 and the auxiliary images selected in operation 108 are stored as a single file in the image archiving unit 136. The main image and the auxiliary images may be stored in a ZIP format along with direction information of the auxiliary image with regard to the main image, or in a file format by which a plurality of images can be stored. The direction information may be stored as accompanying information including the direction of each auxiliary image among 8 directions divided with regard to the main image or the images included in the rank 1, rank 2, etc. . . .

Figure 5:
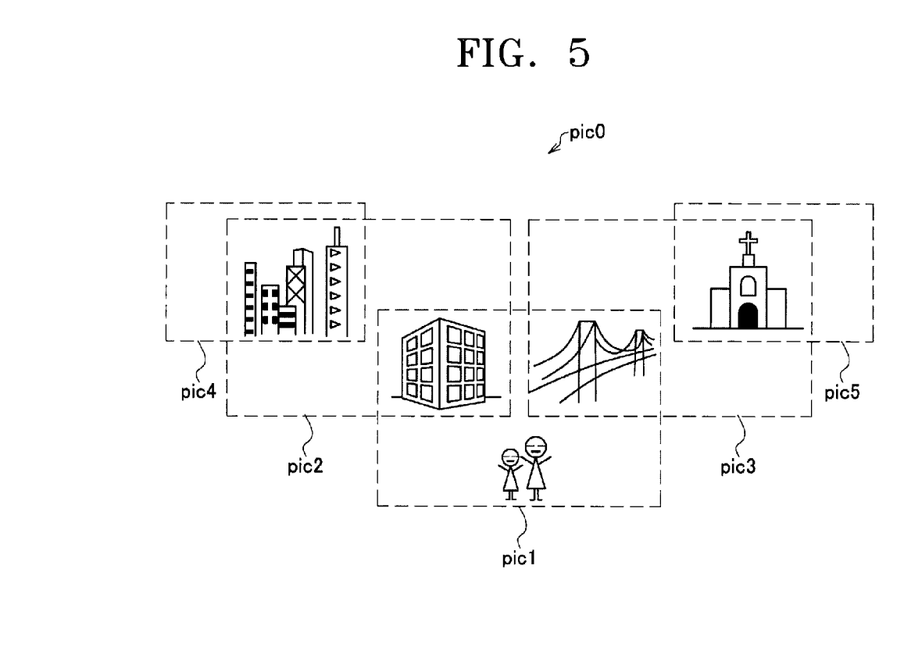
FIG. 5 is a diagram for explaining an example of images when a plurality of image files are archived in the information processing method shown in FIG. 3 according to an embodiment of the present invention.

FIG. 5 is a diagram for explaining an example of images when a plurality of image files are archived in the information processing method shown in FIG. 3 according to an embodiment of the present invention. In this embodiment, a search range includes the ranks 1 and 2. Referring to FIG. 5, an image pic1 is determined as a main image, and the main image and auxiliary images are archived as an image pic0 so that related images can be collected as a single file.

The plurality of image files that is archived as the single file can be viewed by using a method of viewing images included in a file in which direction information is stored as accompanying information. The method of this embodiment is an example, and thus, the present invention is not limited to this method.

Figure 6:
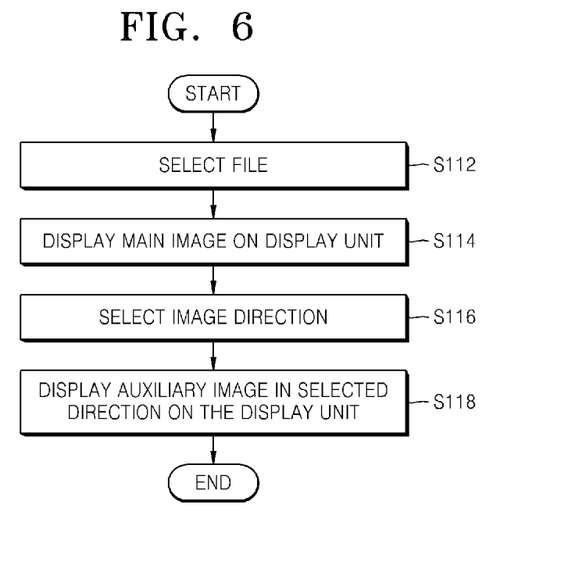
FIG. 6 is a flowchart illustrating an example of an image viewing method according to an embodiment of the present invention.

FIG. 6 is a flowchart illustrating an example of an image viewing method according to an embodiment of the present invention. Referring to FIG. 6, in operation 112, a file that stores a plurality of images is selected. The file may be selected by executing a computer program operating in the information processing apparatus 100, displaying an image file selection screen on the display unit 112, and a user of the information processing apparatus 100 manipulating the input unit 114.

In operation 114, an image that is recorded on the file as a main image is displayed on the display unit 112. The main image is displayed by analyzing direction information included in the file and indicating that the rank 1 images exist around the main image. For example, when the rank 1 images exist in the right upper direction and the left upper direction of the main image, the directions are indicated by arrow icons.

In operation 116, if a direction of the image that is to be displayed by the user is selected, for example, if an arrow icon displayed around the image is selected, in operation 118, an auxiliary image (corresponding to the rank 1 image) in the selected direction is displayed. For example, if the arrow icon indicating the right upper direction of the main image is selected, the rank 1 image corresponding to the selected arrow icon is displayed. In this regard, since the main image is in the left lower direction of the rank 1 image, the rank 1 image may be displayed by an arrow icon in the left lower direction around the image. Furthermore, if the rank 1 image is related to an image included in a lower rank (i.e., the rank 2 image), an arrow icon may be indicated in a direction of the rank 2 image.

Figure 7:
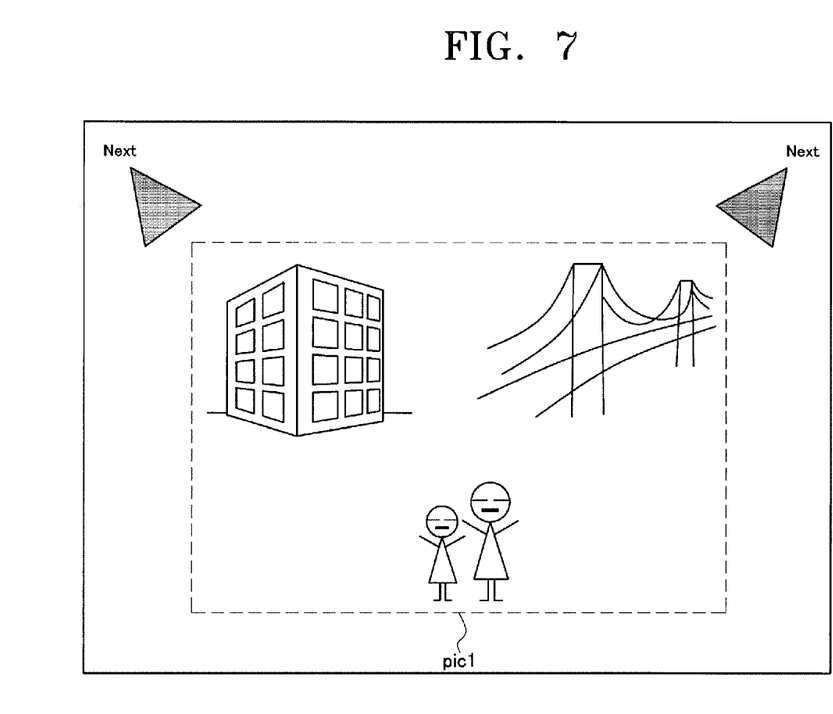
FIG. 7 is a diagram for explaining an example of an image displayed on a display unit in the information processing method shown in FIG. 3 according to an embodiment of the present invention.
Figure 8:
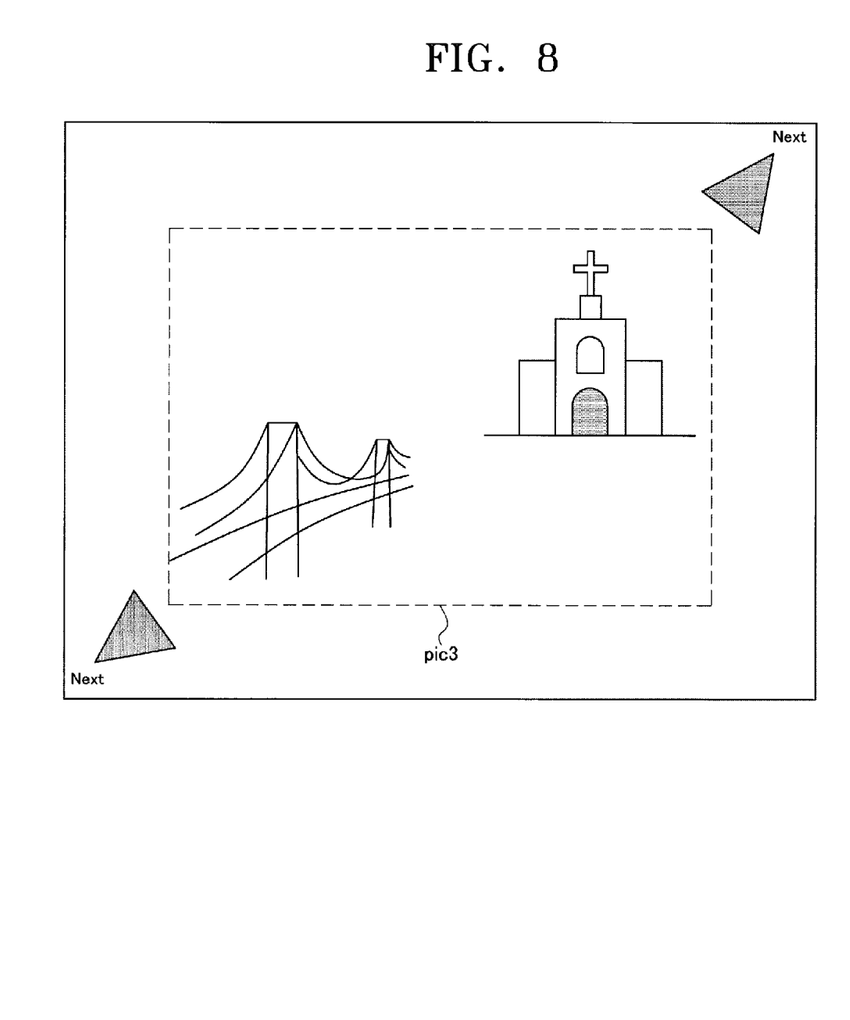
FIG. 8 is a diagram for explaining an example of an image displayed on a display unit in the information processing method shown in FIG. 3 according to another embodiment of the present invention.

FIGS. 7 and 8 are diagrams for explaining examples of an image displayed on the display unit 112 in the information processing method shown in FIG. 3 according to an embodiment of the present invention. FIG. 7 is a diagram of an initial main image pic1 displayed on the display unit 112.

Referring to FIGS. 7 and 8, if an upper right icon is selected, the display unit 112 displays an image pic3, which is the rank 1 image, in the upper right direction of the image pic1. Referring to FIG. 8, two icons indicate a direction of the main image in the lower left direction, and a direction of the rank 2 image in the upper right direction, respectively.

The information processing method of this embodiment has been described. The method may be performed by sequentially executing computer programs stored inside (for example, the ROM 104) the information processing apparatus 100 by using the CPU 102.

As described above, a single main image is determined from among a plurality of images, a feature subject is extracted from the main image, other images (auxiliary images) including the feature subject are searched for, the main image and the auxiliary images are archived as a single file, and the single file is recorded. Accompanying information, such as direction information or time information, can be recorded. Thus, a plurality of related images can be recorded as a single file without simultaneously recording location information when an image is captured. The plurality of images that are archived as the single file can be easily viewed by using the accompanying information.

Figure 9:
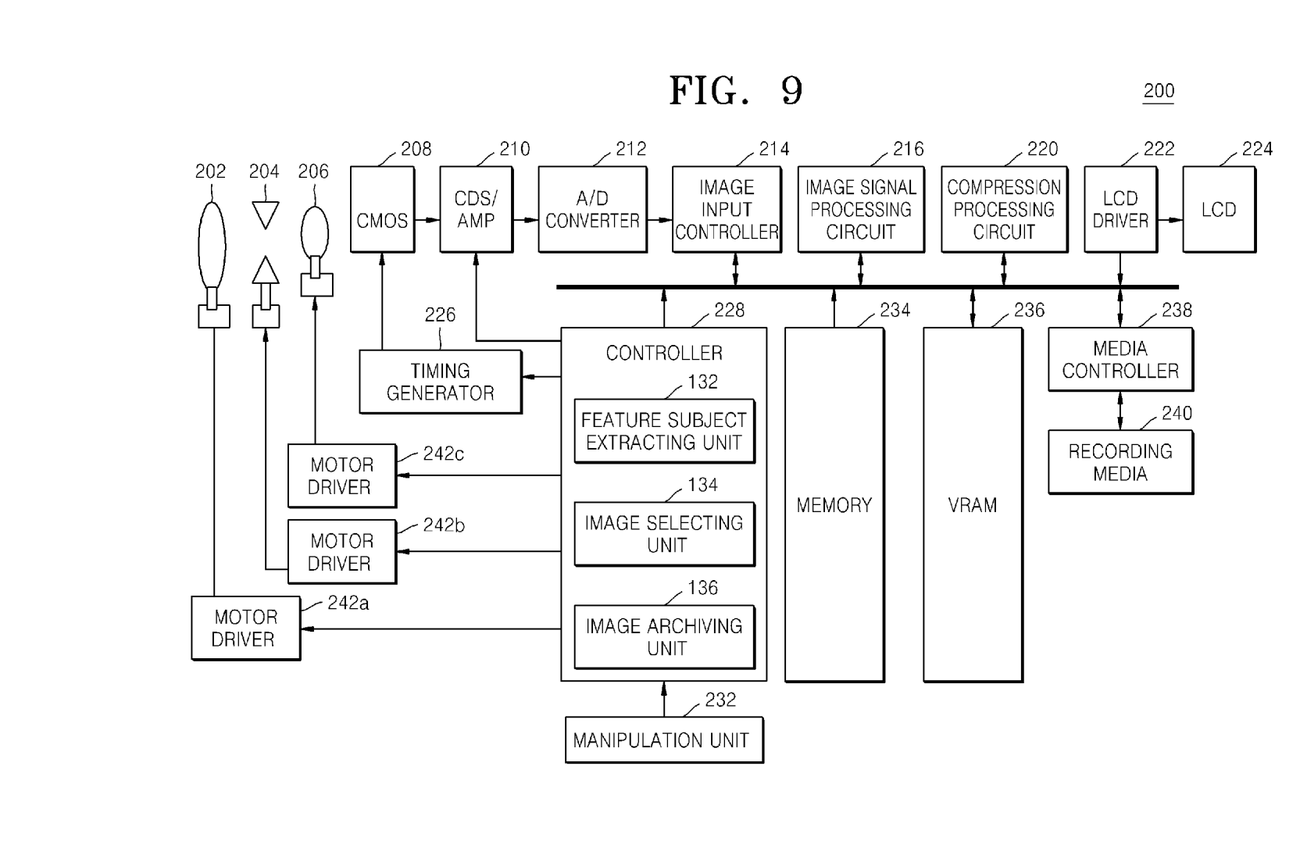
FIG. 9 is a block diagram of an example of a photographing apparatus according to another embodiment of the present invention.

A photographing apparatus, such as a digital camera, that is applied to the present invention will now be described. FIG. 9 is a block diagram of an example of a photographing apparatus 200 according to an embodiment of the present invention. Referring to FIG. 9, the photographing apparatus 200 comprises a zoom lens 202, an iris 204, a focusing lens 206, a complementary metal oxide semiconductor (CMOS) image sensor 208, a correlated double sampling (CDS)/amplifier (AMP) 210, an analog/digital (A/D) converter 212, an image input controller 214, an image signal processing circuit 216, a compression processing circuit 220, a liquid crystal display (LCD) driver 222, an LCD 224, a controller 228, a manipulation unit 232, a memory 234, a video random access memory (VRAM) 236, a media controller 238, a recording media 240, and motor drivers 242a, 242b, and 242c.

The zoom lens 202 is a lens that moves in reverse along an optical axis by a zoom lens driving unit to continuously change a focal distance in order to change the magnification of a subject and photograph the subject. The iris 204 adjusts an amount of light incident on the CMOS image sensor 208 by an iris driving unit when an image is captured.

The focusing lens 206 moves in reverse along the optical axis by a focusing lens driving unit, and adjusts the focus of the subject. In this embodiment, the focusing lens 206 moves from a remote distance to a near distance and exposure-controls several exposure times in order to obtain an in-focus evaluation value. In this embodiment, although there is only one zoom lens 202 and one focusing lens 206 is 1, there may be 2 or more of each.

The CMOS image sensor 208 converts light incident on the zoom lens 202, the iris 204, and the focusing lens 206 into electric signals. In this embodiment, although an electronic shutter is used to control the amount of incident light and time for electric signals, a mechanical shutter can be used instead of the electronic shutter. In addition, the present invention is not limited to the CMOS image sensor 208 of this embodiment but a CCD image sensor may be used instead of the CMOS image sensor 208.

The CDS/AMP 210 includes a CDS circuit that is a kind of a sampling circuit removing noise included in the electric signals generated by the CMOS image sensor 208 and an amplifier for amplifying the electric signals, which are integrally formed with each other. In this embodiment, the CDS circuit and the amplifier are integrally formed with each other in the photographing apparatus 200, however, the CDS circuit and the amplifier can be separately formed.

The A/D converter 212 converts analog electric signals generated by the CMOS image sensor 208 into digital signals and generates raw data of images. The image input controller 214 controls an input of the raw data of images generated by the A/D converter 212 into the memory 234.

The image signal processing circuit 216 compensates a gain of the light amount or controls a white balance with respect to the raw image data output from the CMOS image sensor 208. The image signal processing circuit 216 obtains exposure data of captured images. The exposure data includes an evaluation value for auto in-focus operation (AF evaluation value) or an AE (auto exposure) evaluation value, which is calculated by the image signal processing circuit 216.

The compression processing circuit 220 compresses the image data for which the gain of the light amount is compensated or the white balance is controlled in an appropriate format. The image data may be compressed in a reversible format or in an irreversible format. An example of the appropriate format can be a joint photographic experts group (JPEG) format or a JPEG 2000 format.

The LCD 224 displays a live view image before performing the image pickup operation, setting menus of the photographing apparatus 200, or the captured images. The LCD driver 222 drives the LCD 224 to display the image data or various pieces of information of the photographing apparatus 200.

The controller 228 performs operations and issues commands for controlling the signals with respect to the CMOS image sensor 208, the CDS/AMP 210, etc. and performs operations and issues commands for controlling the operation system with respect to the operation of the manipulation unit 232. In this embodiment, although only one controller 228 is included in the photographing apparatus 200, different controllers (for example, a central processing unit (CPU) and a digital signal processing (DSP)) can separately perform the signal transmission and outputting of the operation commands.

The manipulation unit 232 includes members used to manipulate the photographing apparatus 200 or to manipulate various photographing settings. The members included in the manipulation unit 232 may be a power button, a cross key and a selection button for selecting a photographing mode or a photographing drive mode and setting an effect parameter, a shutter button for performing the image pickup operation, and so on.

The memory 234 temporarily stores the captured images. The capacity of the memory 234 is such that it can store a plurality of images. The memory 234 to and from which images are written and read, is controlled by the image input controller 214. An example of the memory 234 can be a synchronous dynamic random access memory (SDRAM). The VRAM 236 is a memory containing images displayed on the LCD 224, so that the resolution or a maximum expression number varies depending on the capacity of the VRAM 236.

The recording medium 240, which is an example of an image recording unit, records the captured image or combined images output by an image combining unit. The input and output of the recording medium 240 are controlled by the recording media controller 240. An example of the recording medium 240 can be a card type memory device (e.g., a memory card) that records data on a flash memory.

The motor drivers 242a, 242b, and 242c control the zoom lens driving unit, the iris driving unit, and the focusing lens driving unit, respectively. The motor drivers 242a, 242b, and 242c drive the zoom lens 202, the iris 204, and the focus lens 206 to adjust the size, light amount, and the focus of a subject.

The photographing apparatus 200 of this embodiment includes the controller 228 having the feature subject extracting unit 132, the image selecting unit 134, and the image archiving unit 136, thereby determining a main image among a plurality of images captured by the photographing apparatus 200, extracting a feature subject from the main image, searching for other images (auxiliary images) including the feature subject, collecting the main image and the auxiliary images in a single file, and recording the file.

The photographing apparatus 200 can view the recorded file by selecting a file that is to be viewed via a manipulation of the manipulation unit 232 and displaying the main image and the auxiliary images on the LCD 224 in the same manner as the method described with reference to FIG. 3. Therefore, the photographing apparatus 200 can make and view a file including a plurality of images without reading the recording medium 240 on which images captured by the photographing apparatus 200 are recorded in another information processing apparatus, such as a PC.

The embodiments of the present invention described herein can also be embodied as a computer program of a computer. In this case, the computer program executes operations of extracting a feature subject from a main image that is selected from a plurality of images, selecting images including the feature subject, and archiving the main image and the selected images. The computer program can be recorded on a hard disk, a RAM, and a ROM, etc. The computer is not limited to a PC, but can be any suitable type of programmable electronic circuit.

As can be appreciated from the above, according to the embodiments of the present invention described herein, a main image is selected from a plurality of images, and a feature subject is extracted from the main image, and images having the feature subject are archived as a single file.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A photographing apparatus for archiving a plurality of images as a single file, the photographing apparatus comprising:
a feature subject extracting unit configured to determine one of the plurality of images as a main image and to extract at least one feature subject from the main image, wherein the feature subject is a portion of the main image that does not include the entire main image;
an image selecting unit configured to:
determine a search range;
determine a search rank; and
select at least one other image, that includes the feature subject, based on the search rank and search range; and
an image archiving unit configured to archive the main image and the at least one other image selected by the image selecting unit,
wherein the image archiving unit further archives accompanying information regarding the main image and the at least one other image selected by the image selecting unit, and
wherein the accompanying information includes at least one of: color, capture time, and a direction of the at least one other image relative to the main image.

2. The photographing apparatus of claim 1, wherein
the feature subject extracting unit extracts the feature subject that is only included in the image selected by the image selecting unit, and
wherein the image selecting unit selects an image only including the feature subject that is only included in the image selected by the image selecting unit.

3. The photographing apparatus of claim 1, wherein the image archiving unit archives the main image and the image selected by the image selecting unit as the single file on a computer-readable medium.

4. The photographing apparatus of claim 1, wherein
the image selecting unit selects a plurality of images, each including one said feature subject, and
the image archiving unit archives the main image and the images selected by the image selecting unit as the single file.

5. The photographing apparatus of claim 1, wherein the image selecting unit assigns a rank to the image selected.

6. An information processing method of archiving a plurality of images as a single file, the method comprising:
determining, using a processor, one of the plurality of images as a main image and extracting a feature subject from the main image, wherein the feature subject is a portion of the main image that does not include the entire main image;
determining a search range;
determine a search rank;
selecting, using the processor, at least one other image, that includes the feature subject, based on the search rank and search range;
archiving the main image and the selected at least one other image; and
archiving accompanying information regarding the main image and the at least one other image,
wherein the accompanying information includes at least one of: color, capture time, and a direction of the at least one other image relative to the main image.

7. The method of claim 6, wherein
the extracting step extracts the feature subject that is only included in the image selected by the image selecting step, and
the selecting step selects an image only including the feature subject that is only included in the image selected by the image selecting step.

8. The method of claim 6, wherein the image archiving step archives the main image and the image selected by the image selecting step as the single file on a computer-readable medium.

9. The method of claim 6, wherein
the image selecting step selects a plurality of images, each including one said feature subject, and
the image archiving step archives the main image and the images selected by the image selecting step as the single file.

10. The method of claim 6, wherein the image selecting step assigns a rank to the image selected.

11. A non-transitory recording medium having recorded thereon a computer program for executing an information processing method of archiving a plurality of images as a single file, the method comprising:
determining one of the plurality of images as a main image and extracting a feature subject from the main image, wherein the feature subject is a portion of the main image that does not include the entire main image;
determining a search range;
determine a search rank;
selecting at least one other image, that includes the feature subject, based on the search rank and search range;
archiving the main image and the selected at least one other image; and
archiving accompanying information regarding the main image and the at least one other image,
wherein the accompanying information includes at least one of: color, capture time, and a direction of the at least one other image relative to the main image.

12. The recording medium of claim 11, wherein
the extracting step extracts the feature subject that is only included in the image selected by the image selecting step, and
the selecting step selects an image only including the feature subject that is only included in the image selected by the image selecting step.

13. The recording medium of claim 11, wherein the image archiving step archives the main image and the image selected by the image selecting step as the single file.

14. The recording medium of claim 11, wherein
the image selecting step selects a plurality of images, each including one said feature subject, and
the image archiving step archives the main image and the images selected by the image selecting step as the single file on a computer-readable medium.

15. The recording medium of claim 11, wherein the image selecting step assigns a rank to the image selected.

* * * * *